United States Patent
Barbour

(10) Patent No.: US 12,392,222 B1
(45) Date of Patent: Aug. 19, 2025

(54) WELL REHABILITATION METHOD

(71) Applicant: Joel Barbour, Henderson, NV (US)

(72) Inventor: Joel Barbour, Henderson, NV (US)

( * ) Notice: Subject to any disclaimer, the term of this patent is extended or adjusted under 35 U.S.C. 154(b) by 0 days.

(21) Appl. No.: 18/815,558

(22) Filed: Aug. 26, 2024

(51) Int. Cl.
| | |
|---|---|
| *E21B 37/06* | (2006.01) |
| *C02F 1/46* | (2023.01) |
| *C02F 1/50* | (2023.01) |
| *C02F 103/06* | (2006.01) |
| *E21B 37/08* | (2006.01) |
| *E21B 41/02* | (2006.01) |

(52) U.S. Cl.
CPC ............ *E21B 37/06* (2013.01); *C02F 1/4608* (2013.01); *C02F 1/50* (2013.01); *C02F 2103/06* (2013.01); *C02F 2201/46135* (2013.01); *C02F 2209/02* (2013.01); *C02F 2209/05* (2013.01); *C02F 2303/04* (2013.01); *E21B 37/08* (2013.01); *E21B 41/02* (2013.01)

(58) Field of Classification Search
CPC . E21B 37/00; E21B 7/15; E21B 28/00; E21B 41/02; E21B 43/003; E21B 43/128; E21B 37/08; E21B 49/00
See application file for complete search history.

(56) References Cited

U.S. PATENT DOCUMENTS

| | | | |
|---|---|---|---|
| 2016/0024888 A1* | 1/2016 | Parker | ............ E21B 37/08 166/248 |
| 2018/0163517 A1* | 6/2018 | Xiao | ............ F04D 29/708 |
| 2022/0098932 A1* | 3/2022 | C. | ............ E21B 17/0283 |

* cited by examiner

*Primary Examiner* — Zakiya W Bates
(74) *Attorney, Agent, or Firm* — SoCal IP Law Group LLP; Mark A. Goldstein; John E. Gunther

(57) ABSTRACT

A method for remediating a well. A remediation chemical is introduced into the well. An arc discharge tool is inserted into the well and lowered to a predetermined depth within the well, the arc discharge tool configured to generate electrical discharges between a pair of electrodes, the electrical discharges causing shock waves within the fluids within the well. At least one shock wave is generated with the arc discharge tool, and the arc discharge tool is withdrawn from the well.

13 Claims, 5 Drawing Sheets

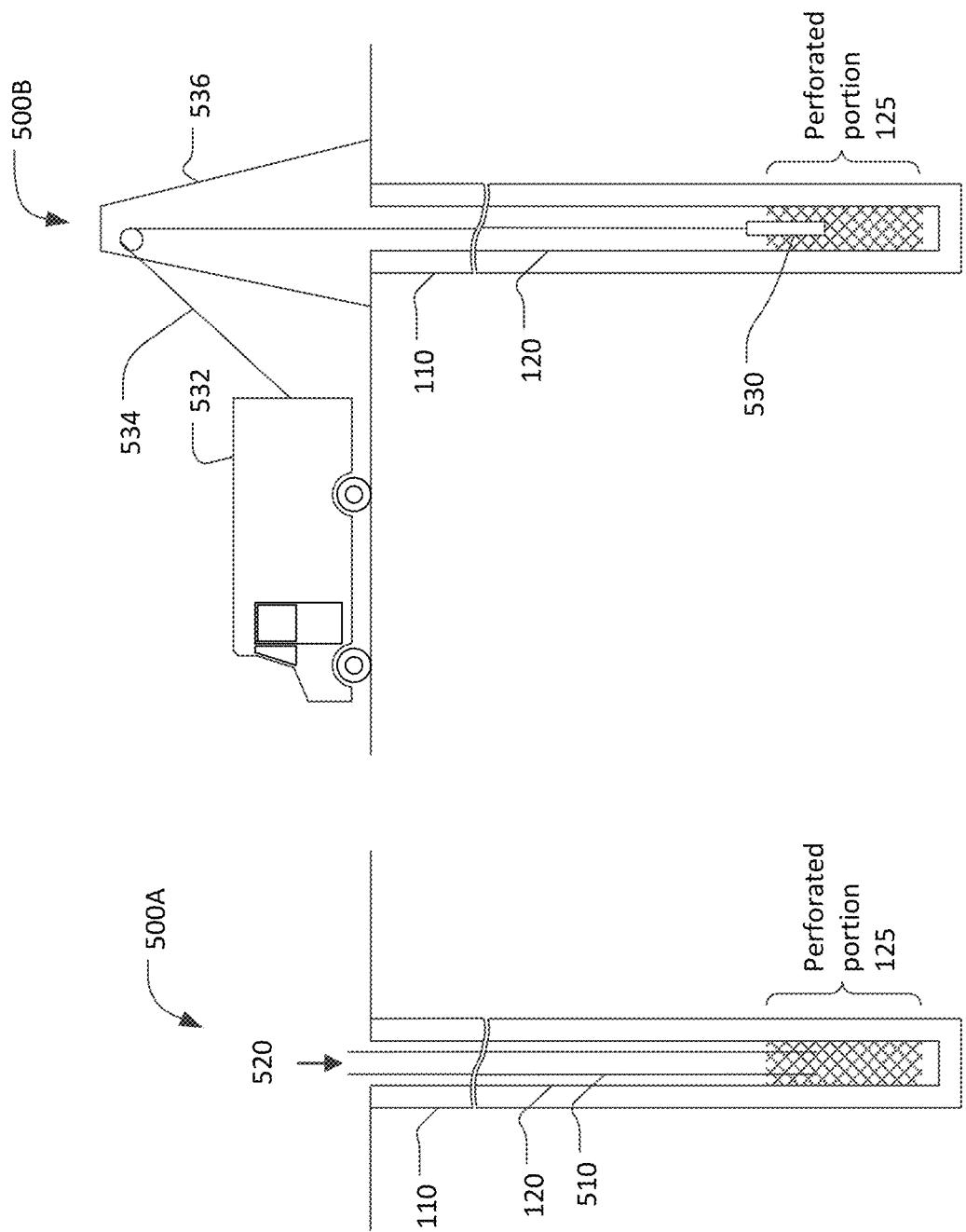

WELL REHABILITATION METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to wells for oil gas, water or geothermal energy, and, in particular, to methods for rehabilitation wells where production output has declined.

Related Art

Petroleum products such as oil and natural gas are commonly produced by drilling a borehole or wellbore into the earth into or through an oil or gas producing subsurface formation. Similarly, water or steam for geothermal energy may be extracted by drilling a wellbore into an appropriate subsurface formation. The fluid (i.e. oil, gas, water, steam, or a mixture thereof) produced by a well will be referred to herein as the "product".

Figure 1:
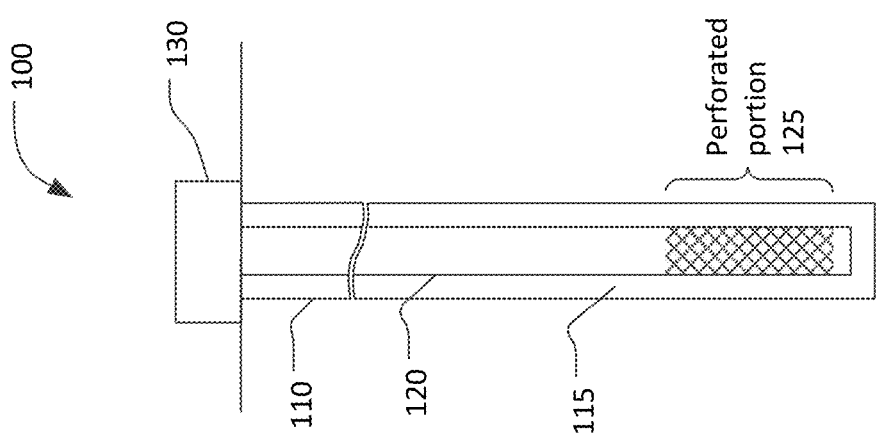

FIG. 1 is a simplified schematic diagram of a well 100 including a pipe 120 extending into a borehole 110 drilled into the earth. The pipe 120 is typically composed of multiple, possibly hundreds, of pipe segments. Each pipe segment has a male thread on one end and a female thread on the other end such that adjacent drill pipe segments can be threaded together to form a continuous pipe. The outer diameter of the pipe 120 may be from 2.5 inches to 8 inches or greater. The pipe 120 is hollow and has a smaller diameter than the borehole 110.

The approximately annular space 115 between the outside of the pipe 120 and the inside of the borehole 110 may be filled by the product. The annular space 115 may be filled with cement. The annular space 115 may be filled with a "gravel pack" that acts as a filter to prevent or inhibit sand from the subsurface layer from entering the pipe 120. The gravel pack may comprise gravel, coarse sand, or a synthetic material such as glass beads.

A portion 125 of the pipe 120 is perforated to allow the product to enter the pipe 120. The perforated portion 125 is typically near or at the lower end of the pipe 120. In some cases, multiple sections of the pipe 120 may be perforated to allow products to be extracted from multiple subsurface formations at different depths. When the annual space 115 is filled with cement, perforations in the pipe 120 may be formed by a perforating tool that uses shaped explosive charges to form holes through the pipe 120 and the surrounding cement. Perforations formed in this manner may extend into the subsurface layer. When the annular space 115 is filled with fluid or a gravel pack, the perforations in the pipe 120 may be formed before the pipe is placed in the borehole 110. In this case, the perforated portion of the pipe is commonly referred to as a "screen".

The pipe 120 terminates at surface equipment 130. In some cases, the hydraulic pressure in the subsurface formation will force the product through the pipe 120 to the surface. In such cases, the surface equipment 130 may include a well head apparatus to control the pressure in the pipe 120. In cases where the product does not rise to the surface due to subsurface pressure, the surface equipment 130 may include all or portions of a pump to pull the product from the well. In either case, surface equipment 130 will include means to capture the product extracted from the well.

Wells may be substantially more complex than the simple example shown in FIG. 1. In particular, a well may include multiple, roughly concentric, pipes descending into a borehole. For example, a well may include an outer pipe or casing cemented to the borehole and an inner pipe or production tube for extracting fluids from the well. In such cases, both the casing and the production tube will be perforated at roughly the same depth to allow fluids to flow from the subsurface formation into the production tube and thence to the surface.

Over time, mineral deposits and/or growth of bacteria and other organic material may degrade the productivity of a well. Minerals and organic material may be deposited with the perforations in the pipes, between grains of a gravel pack, if present, and within perforations and channels in the subsurface formation. Such deposits may obstruct the flow of the product from the subsurface formation to the surface equipment and thus cause a reduction in the flow rate of the product from the well. When the flow rate is reduced to an unacceptable level, a remediation process may be undertaken to restore, to at least some degree, the flow rate of the well.

Well remediation typically uses chemicals to break up or dissolve materials obstructing the fluid flow within a well. Chemicals used in well remediation include strong acids to attack mineral deposits and/or bactericides to attack organic deposits. These and other chemicals used in well remediation will be referred to herein as "remediation chemicals". The use of remediation chemicals may be combined with agitation of the fluids in the well and/or mechanical scrubbing using, for example, a brush or water jet. Debris from the removed deposits may be pumped from the well along with any residual chemicals.

This patent describes an improved well remediation method that uses an arc discharge tool in combination with appropriate remediation chemicals to remove obstructing deposits from a well. An arc discharge tool generates a strong shock wave using an electric discharge between a pair of electrodes. The shock wave may shatter mineral deposits and shred organic deposits which can increase the surface area of the deposits subject to attack by the remediation chemicals. Further, the strong shock wave generated by the arc discharge tool can drive the remediation chemicals through pipe perforations and/or a gravel pack into the perforations and channels in the subsurface formation.

THE DRAWINGS

Figure 2:
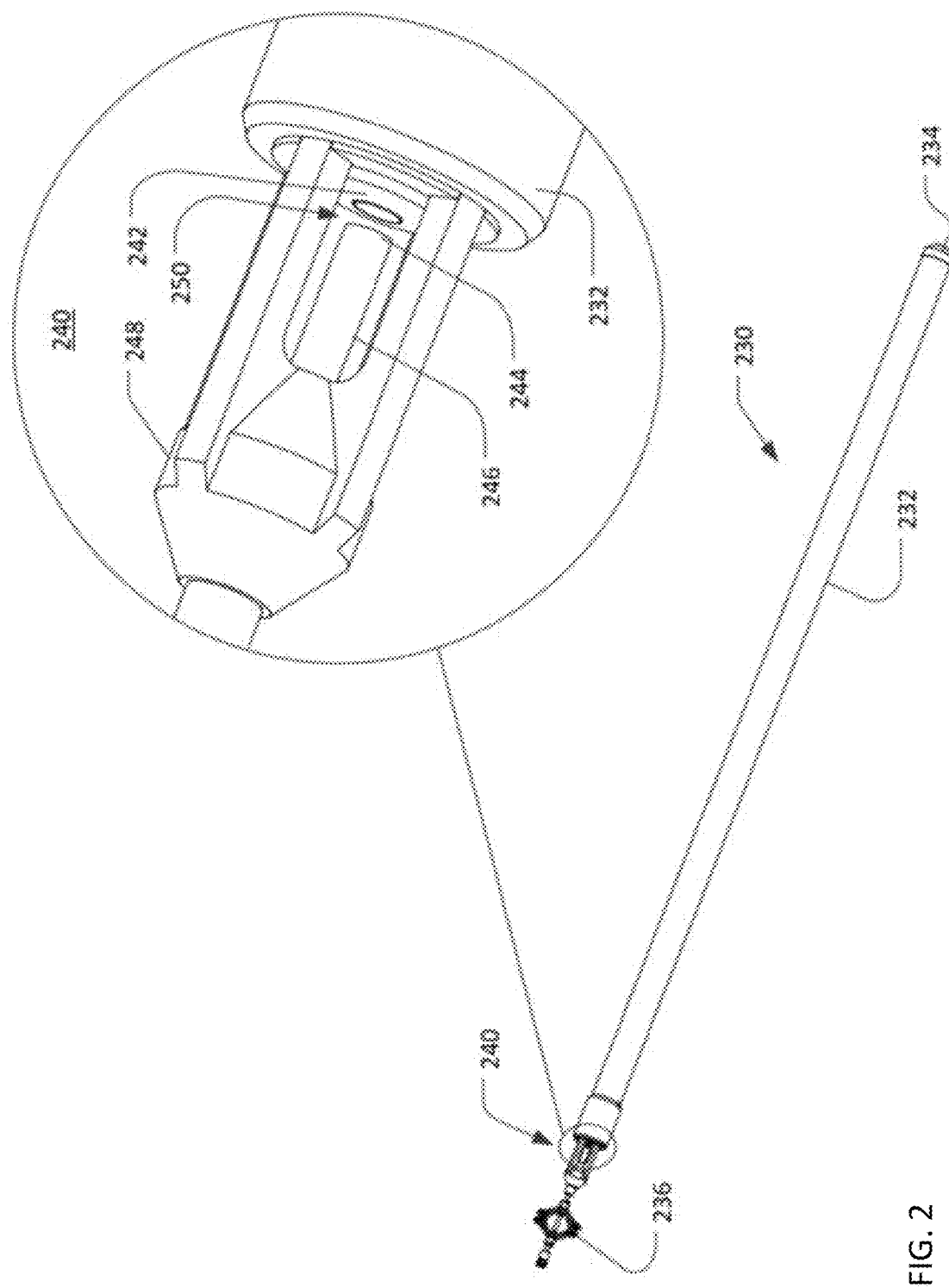
Figure 3:
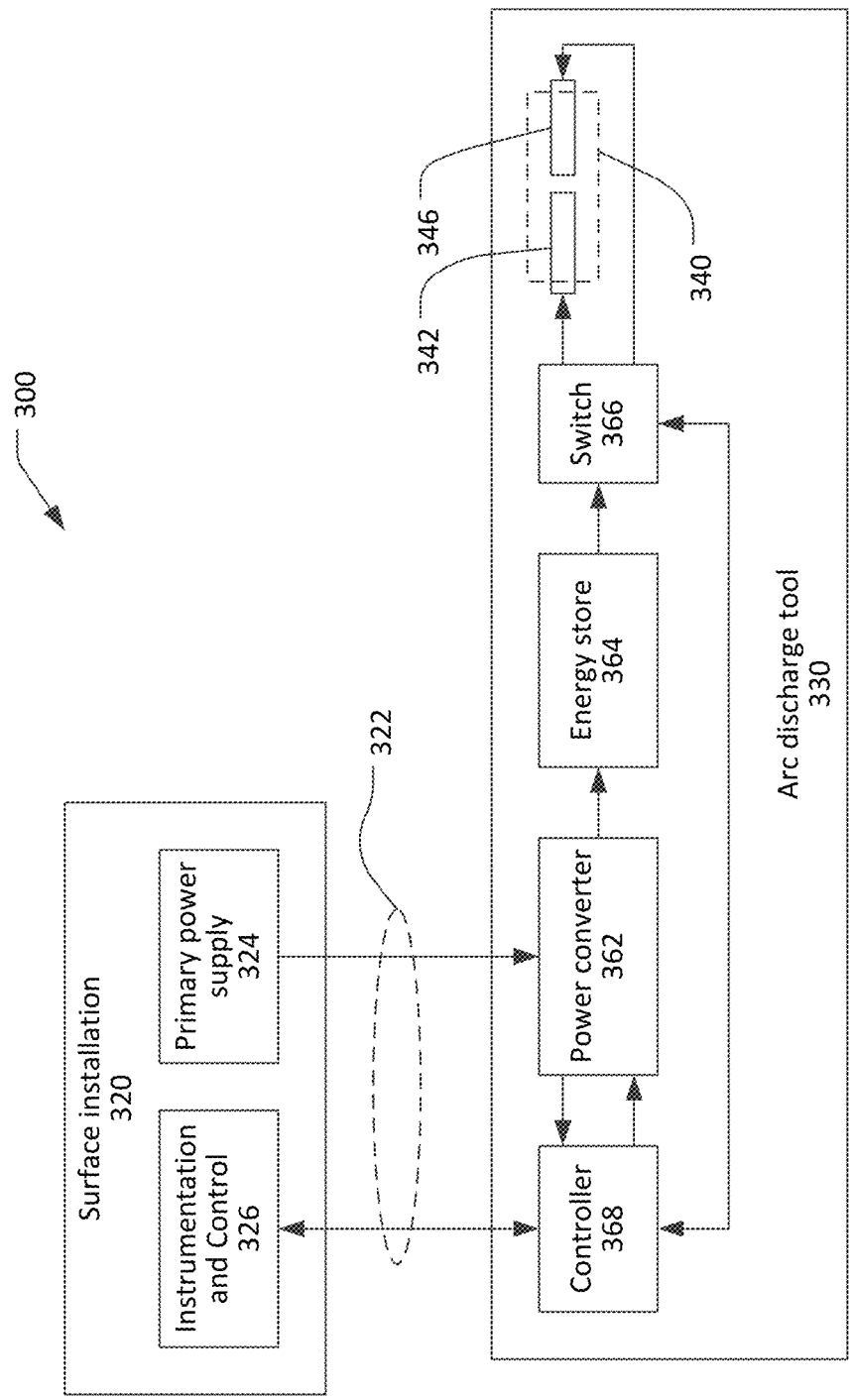
Figure 4:
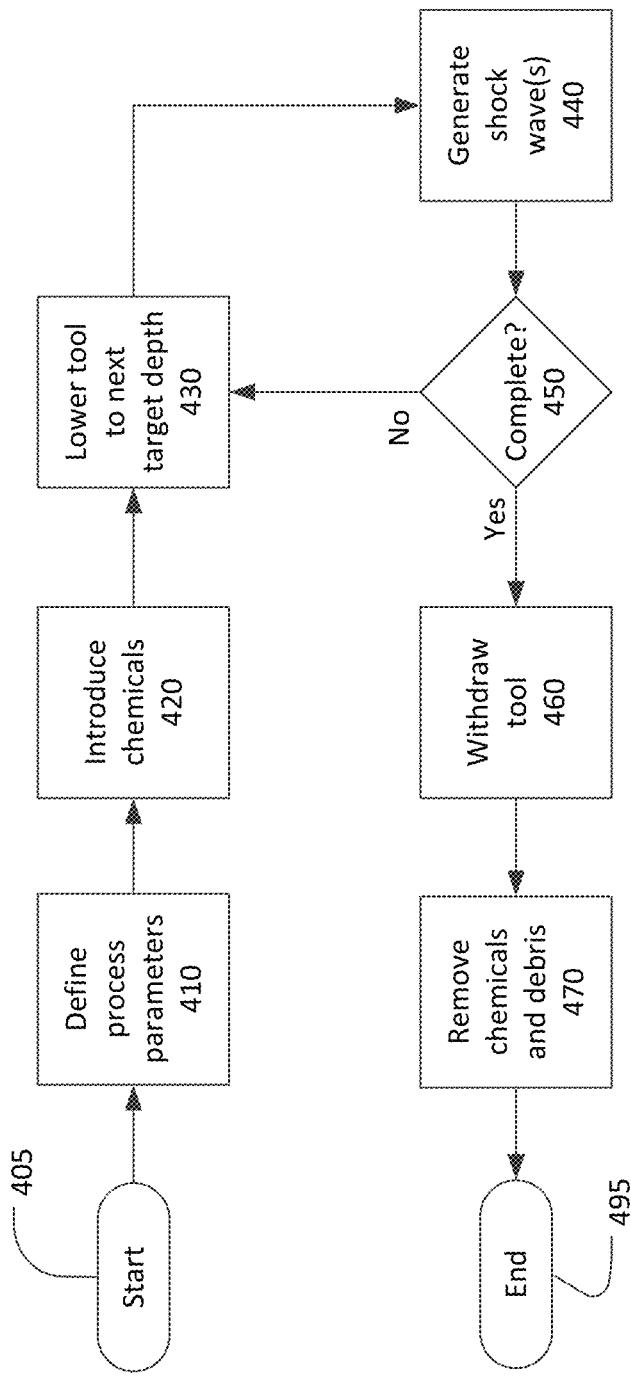

FIG. 1 is a simplified schematic diagram of a well.
FIG. 2 is a perspective view of an exemplary arc discharge tool.
FIG. 3 is a block diagram of the arc discharge tool.
FIG. 4 is a flow chart of a well rehabilitation method.
FIG. 5A is a simplified schematic diagram of a well during a first stage of rehabilitation.

FIG. 5B is a simplified schematic diagram of a well with an electric discharge tool during a second stage of rehabilitation.

Throughout this description, elements appearing in figures are assigned three-digit reference designators, where the most significant digit is the figure number where the element is first introduced, and the two least significant digits are specific to the element. An element that is not described in conjunction with a figure may be presumed to have the same characteristics and function as a previously-described element having the same reference designator.

DETAILED DESCRIPTION

Apparatus

Referring now to FIG. 2, an exemplary arc discharge tool 230, as described in U.S. Pat. No. 8,950,495, may be suitable for use in the well remediation method described herein. Other configurations of arc discharge tools are possible and may be used in the method described herein.

The arc discharge tool 230 has an elongate cylindrical body 232 configured to be lowered into a well to the depth of a perforated portion of the well pipe. A first end 234 of the body is adapted to connect to a cable that provides electrical power to the arc discharge tool 230 and provides a mechanism to lower the arc discharge tool 230 into, and extract the arc discharge tool 230 from, the pipe. A discharge head 240 is located at the opposite end of the body 232. A conventional centralizer 236 may be attached adjacent the discharge head 240 to ensure that the discharge head is centrally located within the well pipe.

As shown in the detail view, the discharge head 240 has a first electrode 242 and a second electrode 246 separated by a gap 250. When a high voltage is placed between the first electrode 242 and the second electrode 246, an electrical discharge can occur across the gap 250. The high voltage may be applied such that either the first electrode 242 or the second electrode 246 is positive and the other electrode is negative. The electrical discharge will produce a substantial shock wave in the fluid present in the gap. The shock wave typically propagates symmetrically and outwardly from the gap to impact the interior wall of the pipe. When the discharge head 240 is positioned in the perforated portion of a well pipe, the shock wave may pass through the perforations in the pipe to impact the subsurface formation. The effect of the impact of the shock wave, in combination with the action of chemicals introduced into the well, may remove mineral deposits and organic materials from the inside of the pipe, the perforations, a gravel pack if present, and the surrounding subsurface formation.

The second electrode 246 is held by a holder 248 having three or four legs coupled to the body 232. The holder 248 holds the second electrode 246 in position to set a desired width of the gap 250 between the first and second electrodes. The holder 248 also provides an electrical connection between the body 232 and the second electrode 246.

The first electrode 242 is separated from the holder 248 by an insulator 244. Insulator 244 provides electrical isolation for the first electrode 242 and inhibits electrical discharge directly between the first electrode 242 and the legs of the holder 248.

FIG. 3 shows a block diagram of an arc discharge system 300 which includes an arc discharge tool 330 which may be the arc discharge tool 230 shown in FIG. 2. The arc discharge system 300 includes a surface installation 320 and the arc discharge tool 330 linked by a cable 322.

The cable 322 may include a wire rope or other structural member for raising and lowering the arc discharge tool 330 into the drill pipe. The cable 322 may also include at least a pair of electrical conductors for conveying electrical power from the surface installation 320 to the arc discharge tool 330. The cable 322 may include one or more additional electrical conductors or optical fibers for conveying data and control information between the surface installation 320 and the arc discharge tool 330.

The surface installation 320 may commonly be housed in a truck, but is not limited to that implementation. The surface installation may include a primary power supply 324, which may be, for example, a generator or batteries. The primary power supply 324 may provide primary power to the arc discharge tool 330 via the cable 322. The primary power may be AC or DC power.

The surface installation 320 may also include an instrumentation and control subsystem 326 to control and document the operation of the cleaning tool. At a minimum, the instrumentation and control subsystem 326 may provide the ability to selectively enable operation of the arc discharge tool 330 when the tool is proximate a perforated portion of the well pipe and to selectively disable operation of the tool in other positions. This may be achieved via commands sent over cable 322. For example, the instrumentation and control subsystem 326 may be configured to control one or more of the rate at which the arc discharge tool 230 descends and ascends in the well pipe, the rate or frequency of electrical discharges produced by the tool 230, the electrical voltage or energy of each discharge, and other operational parameters. The instrumentation and control subsystem 326 may also document the operation of the arc discharge tool. For example, the instrumentation and control subsystem 326 may store or otherwise document the depth and time when the arc discharge tool 330 was activated, the time when the arc discharge tool 330 was deactivated, a count of the number of electric discharges that occurred between activation and deactivation, the time and depth of some or all of the electrical discharges, the time duration and/or peak current of some or all of the electrical discharges, and other information.

The arc discharge tool 330 may include a power converter 362, an energy storage 364, a switch 366, and a controller 368 housed with the body 332 of the arc discharge tool. The power converter 362 may receive primary power from a primary power supply via the cable 322 and may convert the primary power into DC power of sufficiently high voltage to create a discharge between electrodes 342 and 346.

The energy store 364 may be, for example, a high voltage capacitor or a plurality of capacitors connected in series and/or parallel to collectively function as a high voltage capacitor. The power converter 362 may be configured with a limited output current capacity, such that the energy store 364 may be gradually charged from a discharged state to the full voltage output from the power converter. Once the energy store 364 is charged to a desired voltage level, a switch 366 may connect the energy store to the electrodes 342 and 346, causing an electrical discharge that depletes the energy stored in the energy store 364. The power converter 362 may then begin recharging the energy store 364 in preparation for the next electrical discharge.

The switch 366 may be, for example, a triggered spark gap, a solid-state switch using a cascade of semiconductor devices, or a gas-filled or vacuum tube device such as a thyratron or krytron. The switch 366 may be another device or combination of devices capable of both blocking the high voltage level produced by the power converter and passing very high instantaneous current each time the stored energy is discharged through the electrodes 342, 346.

The controller 368 may be configured to control the operation of the cleaning tool and to periodically trigger the switch 366 to initiate a series of electrical discharges between the electrodes 342, 346. The discharge voltage level may be determined by the instrumentation and control subsystem 326 and communicated to the controller 368 in the well via the cable 322. The controller 368 may be configured to selectively enable and disable the operation of the arc discharge tool 330 in response to commands received from the instrumentation and control subsystem 326 via the cable 322. Alternatively, the operation of the arc discharge tool 330 may be enabled and disabled from the surface by selectively providing or not providing the primary power from the primary power supply 324. The controller 368 may also be configured to transmit feedback information to the instrumentation and control subsystem 326 via the cable 322.

Processes

Referring now to FIG. 4, a process 400 for rehabilitating a well may start at 405 when appropriate rehabilitation chemicals and an arc discharge system, such as the arc discharge system 300, are made available at the well. The process 400 may conclude at 495 after the rehabilitation process is completed.

At 410, parameters for the rehabilitation process may be determined. The parameters may include the type and amount of rehabilitation chemicals to be introduced into the well. The selection of the chemicals may be based, for example, on samples of mineral scale and/or organic material extracted from the perforated portion of the well pipe. The parameters may include a depth range and a number of positions within the depth range where the arc discharge tool will be activated. The depth range would typically encompass the perforated portion of the well pipe. The parameters may further include, for example, a spacing between the electrodes of the arc discharge tool, a peak voltage applied between the electrodes, an energy per discharge, and/or a discharge repetition rate. The spacing of the electrodes in the discharge head may be set based, at least in part, on the electrical conductivity or salinity of the fluids in the well. The spacing determined for the electrodes may be generally inverse to the conductivity of the fluids in the drill string at the perforated portion of the well pipe. The electrodes may be closely spaced if the drill string in the well has low conductivity and the electrodes may be spaced further apart if the fluids are highly conductive. The energy per discharge may be set, at least in part, based on the inside diameter of the perforated portion of the well pipe. The operating parameters of the arc discharge tool may be set, in part, based on other parameters such as the temperature, viscosity, dielectric constant, or other parameter indicative of the fluid content of the perforated portion of the well pipe. Where necessary, a survey of the well may be performed by lowering one or more tools into the well to measure necessary parameters of the fluid at the perforated portion of the well pipe.

At 420, the chemicals selected at 410 may be introduced into the well. The chemicals may be in liquid, granular, or pelletized form. A variety of techniques may be used to introduce the chemicals into the well. The surface equipment of the well may include a port that allows chemicals to be introduced into the well without disassembling or removing any of the surface equipment. In other cases, a portion or all of the surface equipment may have to the disassembled from the well in order to introduce the chemicals.

In some cases, the chemicals may simply be poured into the top of the well pipe. In other cases, the chemicals may be introduced into the well through a tube inserted into the well pipe. For example, FIG. 5A is a simplified schematic diagram of well 500A including a well bore 110 and a pipe 120 including a perforated portion 125. Chemicals 520 may be introduced into the well through a tube 510 inserted into the pipe 120. The tube 510 provides delivery of the chemicals 520 directly to the perforated portion 125 of the pipe 120. The tube 510 also allows recirculation of the fluid in the well pipe to flush the chemicals from the well at the conclusion of the remediation process.

At 430, the arc discharge tool may be lowered into the drill pipe to a first position within the depth range defined at 410. For example, as shown in FIG. 5B, the arc discharge tool 530 may be lowered on a cable 534 supported by a derrick 536. A truck 532 contains the surface installation (320 in FIG. 3) of the arc discharge system and a winch to reel the cable in and out and thus control the depth of the arc discharge tool 530 within the well. Although shown separately in FIG. 5B, the derrick 536 may be boom or arm extending from the truck 532.

At 440, the arc discharge system may be activated to cause one or more discharges between electrodes of the arc discharge tool. The discharge energy, repetition rate, and number of discharges may be as defined at 410. Each discharge creates a shock wave within the well pipe to disrupt mineral and organic deposits. Each discharge may drive the remediation chemicals through the perforations in the well pipe into the subsurface formation.

At 450, a determination is made if the arc discharge tool has been activated at all of the positions defined at 410. When a determination is made at 450 that the process is not completed and the arc discharge tool should be activated at one or more additional position ("no" at 450), the process returns to 430 and the arc discharge tool is moved to the next position.

When the arc discharge tool has been activated at all of the positions selected at 410 ("yes" at 450), the arc discharge tool is removed from the well at 460. Residual chemicals and debris may be pumped or flushed from the well at 470 and the process 400 ends at 495.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for remediating a well, comprising:
   introducing a remediation chemical into the well;
   inserting an arc discharge tool into the well and lowering the arc discharge tool to a predetermined depth within the well, the arc discharge tool for generating one or more electrical discharges between a pair of electrodes, each electrical discharge causing a shock wave in the fluids within the well;
   generating, with the arc discharge tool, at least one shock wave; and
   withdrawing the arc discharge tool from the well.

2. The method of claim 1, further comprising:
   prior to inserting the arc discharge tool, defining arc discharge tool operating parameters comprising one or more of a spacing between the pair of electrodes, a peak voltage applied between the pair of electrodes, an initial energy per discharge, and a discharge repetition rate.

3. The method of claim 2, wherein the arc discharge tool operating parameters are defined based, in part, on an inside diameter of the well at the predetermined depth.

4. The method of claim 2, wherein the arc discharge tool operating parameters are defined based, in part, on one or more of an electrical conductivity, a salinity, a temperature, a viscosity, and a dielectric constant of a fluids in the well at the predetermined depth.

5. The method of claim 1, wherein the remediation chemical comprises one or more of an acid and a bactericide.

6. A method for remediating a well including a pipe with a perforated portion for extracting a fluid from a subsurface formation, the method comprising:
   introducing a remediation chemical into the well;
   inserting an arc discharge tool into the pipe and lowering the arc discharge tool to an initial position within the perforated portion of the pipe, the arc discharge tool for generating one or more electrical discharges between a pair of electrodes, each electrical discharge causing a shock wave in the fluids within the pipe;
   generating, with the arc discharge tool, at least one shock wave; and
   withdrawing the arc discharge tool from the well.

7. The method of claim 6, wherein the at least one shock wave drives the remediation chemical through perforations in the perforated portion of the pipe into the subsurface formation.

8. The method of claim 6, further comprising:
   prior to withdrawing the arc discharge tool, moving the arc discharge tool to one or more additional positions within the perforated portion of the pipe; and
   generating, with the arc discharge tool, at least one shock wave at each additional position.

9. The method of claim 6, further comprising:
   after withdrawing the arc discharge tool, removing residual remediation chemical and debris from the well.

10. The method of claim 6, further comprising:
    prior to inserting the arc discharge tool, defining arc discharge tool operating parameters comprising one or more of a spacing between the pair of electrodes, a peak voltage applied between the pair of electrodes, an initial energy per discharge, and a discharge repetition rate.

11. The method of claim 10, wherein the arc discharge tool operating parameters are defined based, in part, on an inside diameter of the perforated portion of the pipe.

12. The method of claim 10, wherein the arc discharge tool operating parameters are defined based, in part, on one or more of an electrical conductivity, a salinity, a temperature, a viscosity, and a dielectric constant of a fluids in the perforated portion of the pipe.

13. The method of claim 6, wherein the remediation chemical comprises one or more of an acid and a bactericide.

* * * * *